(12) United States Patent
Brown et al.

(10) Patent No.: US 7,940,265 B2
(45) Date of Patent: *May 10, 2011

(54) MULTIPLE SPACIAL INDEXES FOR DYNAMIC SCENE MANAGEMENT IN GRAPHICS RENDERING

(75) Inventors: Jeffrey D. Brown, Rochester, MN (US); Russell D. Hoover, Rochester, MN (US); Jamie R. Kuesel, Rochester, MN (US); Eric O. Mejdrich, Rochester, MN (US); Robert A. Shearer, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 630 days.

This patent is subject to a terminal disclaimer.

(21) Appl. No.: 11/535,568

(22) Filed: Sep. 27, 2006

(65) Prior Publication Data

US 2008/0074416 A1 Mar. 27, 2008

(51) Int. Cl.
*G06T 15/50* (2006.01)
*G06T 15/00* (2006.01)

(52) U.S. Cl. ........................................ 345/426; 345/419

(58) Field of Classification Search .................. None
See application file for complete search history.

(56) References Cited

U.S. PATENT DOCUMENTS

| | | | |
|---|---|---|---|
| 6,088,035 A | 7/2000 | Sudarsky et al. | |
| 7,012,604 B1 * | 3/2006 | Christie et al. | 345/426 |
| 7,164,420 B2 * | 1/2007 | Ard | 345/423 |
| 7,289,118 B2 * | 10/2007 | Schmittler et al. | 345/423 |
| 2003/0227455 A1 * | 12/2003 | Lake et al. | 345/421 |
| 2006/0066607 A1 * | 3/2006 | Schmittler et al. | 345/419 |
| 2007/0182732 A1 * | 8/2007 | Woop et al. | 345/420 |
| 2008/0043018 A1 * | 2/2008 | Keller et al. | 345/426 |
| 2008/0192054 A1 | 8/2008 | Fowler et al. | |

OTHER PUBLICATIONS

Ingo Wald, Carsten Benthin, Philipp Slusallek, "Distributed Interactive Ray Tracing of Dynamic Scenes," Parallel and Large-Data Visualization and Graphics, IEEE Symposium on, vol. 0, No. 0, pp. 11, 2003 IEEE Symposium on Parallel and Large-Data Visualization and Graphics (PVG'03), 2003.*
L. Szecsi, B. Benedek, and L. Szirmay-Kalos. Accelerating Animation Through Verification of Shooting Walks. In Proceedings of SCCG, pp. 231-238. ACM Press, 2003.*
Lext, J. and Akenine-Moller, T. 2001. Towards rapid reconstruction for animated ray tracing. In Proceedings of Eurographics Short Presentations.*
Subramanian, K. R. and Fussell, D. S. 1990. Applying space subdivision techniques to volume rendering. In Proceedings of the 1st Conference on Visualization '90 (San Francisco, California, Oct. 23-26, 1990). A. Kaufman, Ed. IEEE Visualization. IEEE Computer Society Press, Los Alamitos.*
Office Action History of U.S. Appl. No. 11/674,821, dates ranging from Apr. 6, 2009 to Jun. 16, 2010.

* cited by examiner

*Primary Examiner* — Daniel F Hajnik
(74) *Attorney, Agent, or Firm* — Patterson & Sheridan LLP

(57) ABSTRACT

According to embodiments of the invention, separate spatial indexes may be created which correspond to dynamic objects in a three dimensional scene and static objects in the three dimensional scene. By creating separate spatial indexes for static and dynamic objects, only the dynamic spatial index may need to be rebuilt in response to movement or changes in shape of objects in the three dimensional scene. Furthermore, the static and dynamic spatial indexes may be stored in separate portions of an image processing system's memory cache. By storing the static spatial index and the dynamic spatial index in separate portions of the memory cache, the dynamic portion of the memory cache may be updated without affecting the static portion of the spatial index in the memory cache.

19 Claims, 10 Drawing Sheets

MULTIPLE SPACIAL INDEXES FOR DYNAMIC SCENE MANAGEMENT IN GRAPHICS RENDERING

BACKGROUND OF THE INVENTION

1. Field of the Invention

Embodiments of the invention generally relate to the field of computer processing.

2. Description of the Related Art

The process of rendering two-dimensional images from three-dimensional scenes is commonly referred to as image processing. As the modern computer industry evolves image processing evolves as well. One particular goal in the evolution of image processing is to make two-dimensional simulations or renditions of three-dimensional scenes as realistic as possible. One limitation of rendering realistic images is that modern monitors display images through the use of pixels.

A pixel is the smallest area of space which can be illuminated on a monitor. Most modern computer monitors will use a combination of hundreds of thousands or millions of pixels to compose the entire display or rendered scene. The individual pixels are arranged in a grid pattern and collectively cover the entire viewing area of the monitor. Each individual pixel may be illuminated to render a final picture for viewing.

One technique for rendering a real world three-dimensional scene onto a two-dimensional monitor using pixels is called rasterization. Rasterization is the process of taking a two-dimensional image represented in vector format (mathematical representations of geometric objects within a scene) and converting the image into individual pixels for display on the monitor. Rasterization is effective at rendering graphics quickly and using relatively low amounts of computational power; however, rasterization suffers from some drawbacks. For example, rasterization often suffers from a lack of realism because it is not based on the physical properties of light, rather rasterization is based on the shape of three-dimensional geometric objects in a scene projected onto a two dimensional plane. Furthermore, the computational power required to render a scene with rasterization scales directly with an increase in the complexity of the scene to be rendered. As image processing becomes more realistic, rendered scenes also become more complex. Therefore, rasterization suffers as image processing evolves, because rasterization scales directly with complexity.

Another technique for rendering a real world three-dimensional scene onto a two-dimensional monitor using pixels is called ray tracing. The ray tracing technique traces the propagation of imaginary rays, rays which behave similar to rays of light, into a three-dimensional scene which is to be rendered onto a computer screen. The rays originate from the eye(s) of a viewer sitting behind the computer screen and traverse through pixels, which make up the computer screen, towards the three-dimensional scene. Each traced ray proceeds into the scene and may intersect with objects within the scene. If a ray intersects an object within the scene, properties of the object and several other contributing factors are used to calculate the amount of color and light, or lack thereof, the ray is exposed to. These calculations are then used to determine the final color of the pixel through which the traced ray passed.

The process of tracing rays is carried out many times for a single scene. For example, a single ray may be traced for each pixel in the display. Once a sufficient number of rays have been traced to determine the color of all of the pixels which make up the two-dimensional display of the computer screen, the two dimensional synthesis of the three-dimensional scene can be displayed on the computer screen to the viewer.

Ray tracing typically renders real world three dimensional scenes with more realism than rasterization. This is partially due to the fact that ray tracing simulates how light travels and behaves in a real world environment, rather than simply projecting a three dimensional shape onto a two dimensional plane as is done with rasterization. Therefore, graphics rendered using ray tracing more accurately depict on a monitor what our eyes are accustomed to seeing in the real world.

Furthermore, ray tracing also handles increases in scene complexity better than rasterization as scenes become more complex. Ray tracing scales logarithmically with scene complexity. This is due to the fact that the same number of rays may be cast into a scene, even if the scene becomes more complex. Therefore, ray tracing does not suffer in terms of computational power requirements as scenes become more complex as rasterization does.

One major drawback of ray tracing is the large number of calculations, and thus processing power, required to render scenes. This leads to problems when fast rendering is needed. For example, when an image processing system is to render graphics for animation purposes such as in a game console. Due to the increased computational requirements for ray tracing it is difficult to render animation quickly enough to seem realistic (realistic animation is approximately twenty to twenty-four frames per second).

Therefore, there exists a need for more efficient techniques and devices to perform ray tracing.

SUMMARY OF THE INVENTION

Embodiments of the present invention generally provide methods and apparatus for performing ray tracing.

According to one embodiment of the invention, a method of representing objects located within a three dimensional scene in spatial indexes is provided. The method generally comprising: generating a static spatial index based on at least one static object in the three dimensional scene, the static spatial index having nodes defining bounded volumes of the three dimensional scene; and generating a dynamic spatial index based on at least one dynamic object in the three dimensional scene, the dynamic spatial index having nodes defining bounded volumes of the three dimensional scene.

According to another embodiment of the invention, a computer readable medium is provided. The computer readable medium containing a program which, when executed, performs operations generally comprising: generating a static spatial index based on at least one static object in a three dimensional scene, the static spatial index having nodes defining bounded volumes of the three dimensional scene; and generating a dynamic spatial index based on at least one dynamic object in the three dimensional scene, the dynamic spatial index having nodes defining bounded volumes of the three dimensional scene.

According to another embodiment of the invention, an image processing system is provided. The image processing system generally comprising: a static spatial index based on at least one static object in a three dimensional scene, the static spatial index having nodes defining bounded volumes of the three dimensional scene; a dynamic spatial index based on at least one dynamic object in the three dimensional scene, the dynamic spatial index having nodes defining bounded volumes of the three dimensional scene; a first processing element configured to: issue a ray into the three dimensional scene; traverse the dynamic spatial index by taking branches to nodes based on the ray intersecting bounding volumes corresponding to nodes in the dynamic spatial index until a dynamic spatial index leaf node is reached, and determine if the ray strikes a primitive contained within a bounding volume corresponding to the dynamic spatial index leaf node; and traverse the static spatial index based on the ray intersecting bounding volumes corresponding to nodes in static spatial index until a static spatial index leaf node is reached, and determine if the ray strikes a primitive contained within a bounding volume corresponding to the static spatial index leaf node.

DETAILED DESCRIPTION OF THE PREFERRED EMBODIMENTS

Figure 1:
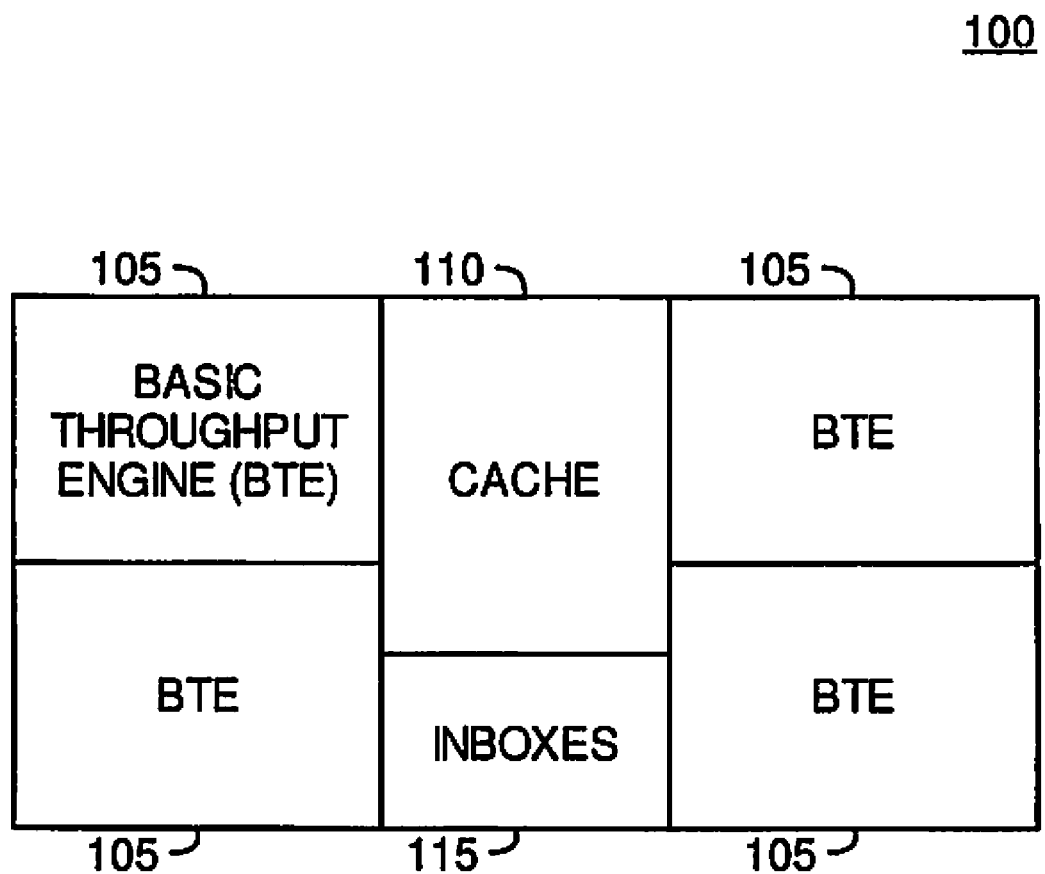
FIG. 1 illustrates a multiple core processing element, according to one embodiment of the invention.

Embodiments of the invention provide methods and apparatus for creating separate spatial indexes corresponding to static and dynamic objects in a three dimensional scene. According to one embodiment of the invention, a static spatial index may represent all objects which do not move or change shape in a three dimensional scene over a relatively long period of time. According to embodiments of the invention, a dynamic spatial index may represent all objects which may move or change shape in a three dimensional scene over a relatively short period of time. Furthermore, according to one embodiment of the invention, a dynamic spatial index may be stored in a separate portion of memory than a static spatial index. By creating a separate spatial index for dynamic objects and storing the dynamic spatial index in a separate portion of memory, the dynamic spatial index may be updated in response to changes in position or shape of dynamic objects without affecting the static spatial index. Updating the dynamic spatial index in response to changes in position or shape of dynamic objects without updating the static spatial index may reduce the amount of time necessary to perform image processing.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable media. Illustrative computer-readable media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such computer-readable media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

An Exemplary Processor Layout and Communications Network

FIG. 1 illustrates a multiple core processing element 100, according to one embodiment of the invention. The multiple core processing element 100 includes a plurality of basic throughput engines 105 (BTEs). A BTE 105 may contain a plurality of processing threads and a core cache (e.g., an L1 cache). The processing threads located within each BTE may have access to a shared multiple core processing element cache 110 (e.g., an L2 cache).

The BTEs 105 may also have access to a plurality of inboxes 115. The inboxes 115 may be memory mapped address space. The inboxes 115 may be mapped to the processing threads located within each of the BTEs 105. Each thread located within the BTEs may have a memory mapped inbox and access to all of the other memory mapped inboxes 115. The inboxes 115 make up a low latency and high bandwidth communications network used by the BTEs 105.

The BTEs may use the inboxes 115 as a network to communicate with each other and redistribute data processing work amongst the BTEs. For some embodiments, separate outboxes may be used in the communications network, for example, to receive the results of processing by BTEs 105. For other embodiments, inboxes 115 may also serve as outboxes, for example, with one BTE 105 writing the results of a processing function directly to the inbox of another BTE 105 that will use the results.

The aggregate performance of an image processing system may be tied to how well the BTEs can partition and redistribute work. The network of inboxes 115 may be used to collect and distribute work to other BTEs without corrupting the shared multiple core processing element cache 110 with BTE communication data packets that have no frame to frame coherency. An image processing system which can render many millions of triangles per frame may include many BTEs 105 connected in this manner.

In one embodiment of the invention, the threads of one BTE 105 may be assigned to a workload manager. An image processing system may use various software and hardware components to render a two dimensional image from a three dimensional scene. According to one embodiment of the invention, an image processing system may use a workload manager to traverse a spatial index with a ray issued by the image processing system. A spatial index, as described further below with regards to FIG. 4, may be implemented as a tree type data structure used to partition a relatively large three dimensional scene into smaller bounding volumes. An image processing system using a ray tracing methodology for image processing may use a spatial index to quickly determine ray-bounding volume intersections. In one embodiment of the invention, the workload manager may perform ray-bounding volume intersection tests by using the spatial index.

In one embodiment of the invention, other threads of the multiple core processing element BTEs 105 on the multiple core processing element 100 may be vector throughput engines. After a workload manager determines a ray-bounding volume intersection, the workload manager may issue (send), via the inboxes 115, the ray to one of a plurality of vector throughput engines. The vector throughput engines may then determine if the ray intersects a primitive contained within the bounding volume. The vector throughput engines may also perform operations relating to determining the color of the pixel through which the ray passed.

Figure 2:
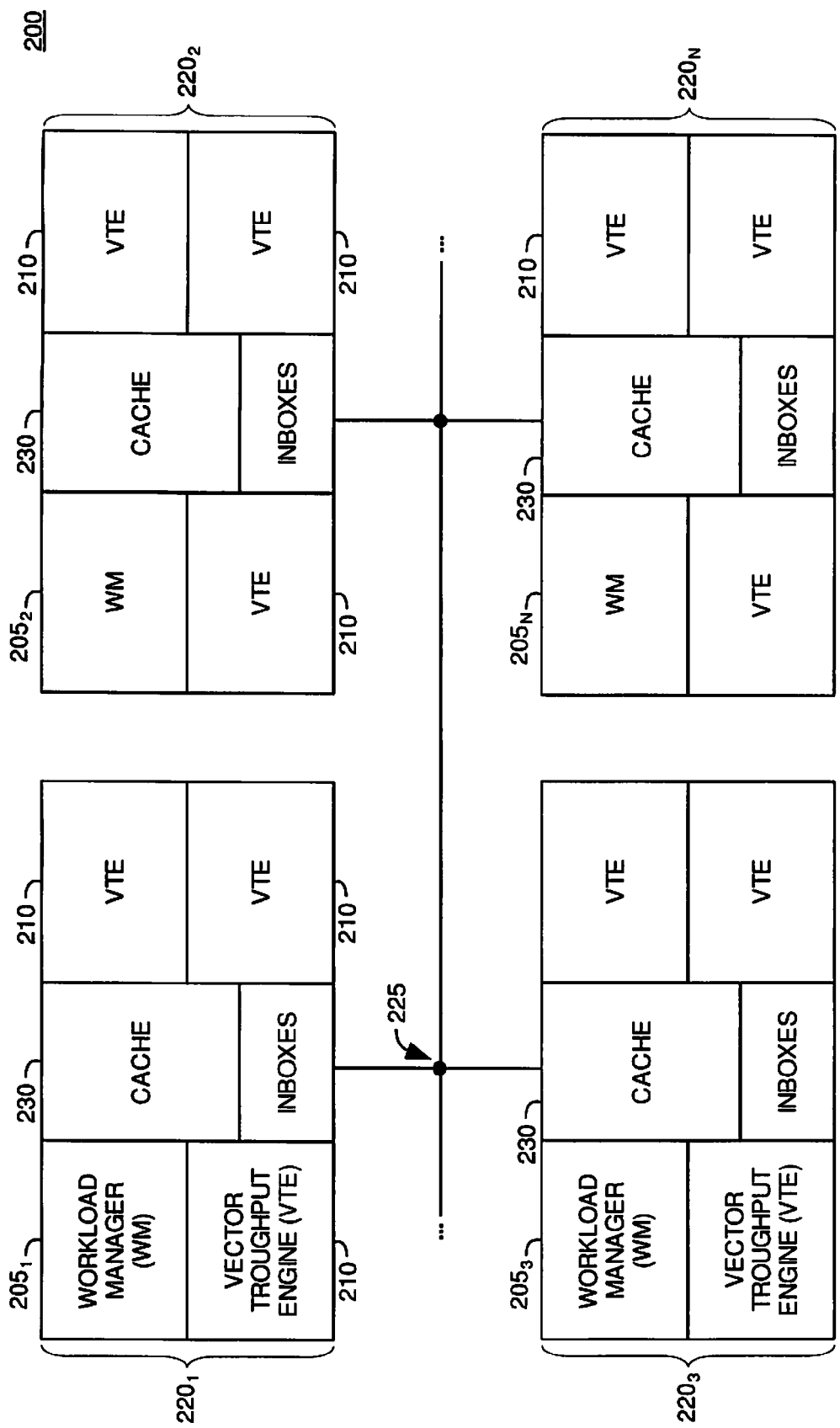
FIG. 2 illustrates multiple core processing element networks, according to embodiments of the invention.

FIG. 2 illustrates a network of multiple core processing elements 200, according to one embodiment of the invention. FIG. 2 also illustrates one embodiment of the invention where the threads of one of the BTEs of the multiple core processing element 100 is a workload manager 205. Each multiple core processing element $220_{1-N}$ in the network of multiple core processing elements 200 may contain one workload manager $205_{1-N}$, according to one embodiment of the invention. Each multiple core processing element $220_{1-N}$ in the network of multiple core processing elements 200 may also contain a plurality of vector throughput engines 210, according to one embodiment of the invention.

The workload managers $205_{1-N}$ may use a high speed bus 225 to communicate with other workload managers $205_{1-N}$ and/or vector throughput engines 210 of other multiple core processing elements $220_{1-N}$, according to one embodiment of the invention. Each of the vector throughput engines 210 may use the high speed bus 225 to communicate with other vector throughput engines 210 or the workload managers $205_{1-N}$. The workload manager processors 205 may use the high speed bus 225 to collect and distribute image processing related tasks to other workload managers $205_{1-N}$, and/or distribute tasks to other vector throughput engines 210. The use of a high speed bus 225 may allow the workload managers $205_{1-N}$ to communicate without affecting the caches 230 with data packets related to workload manager communications.

An Exemplary Three Dimensional Scene

Figure 3:
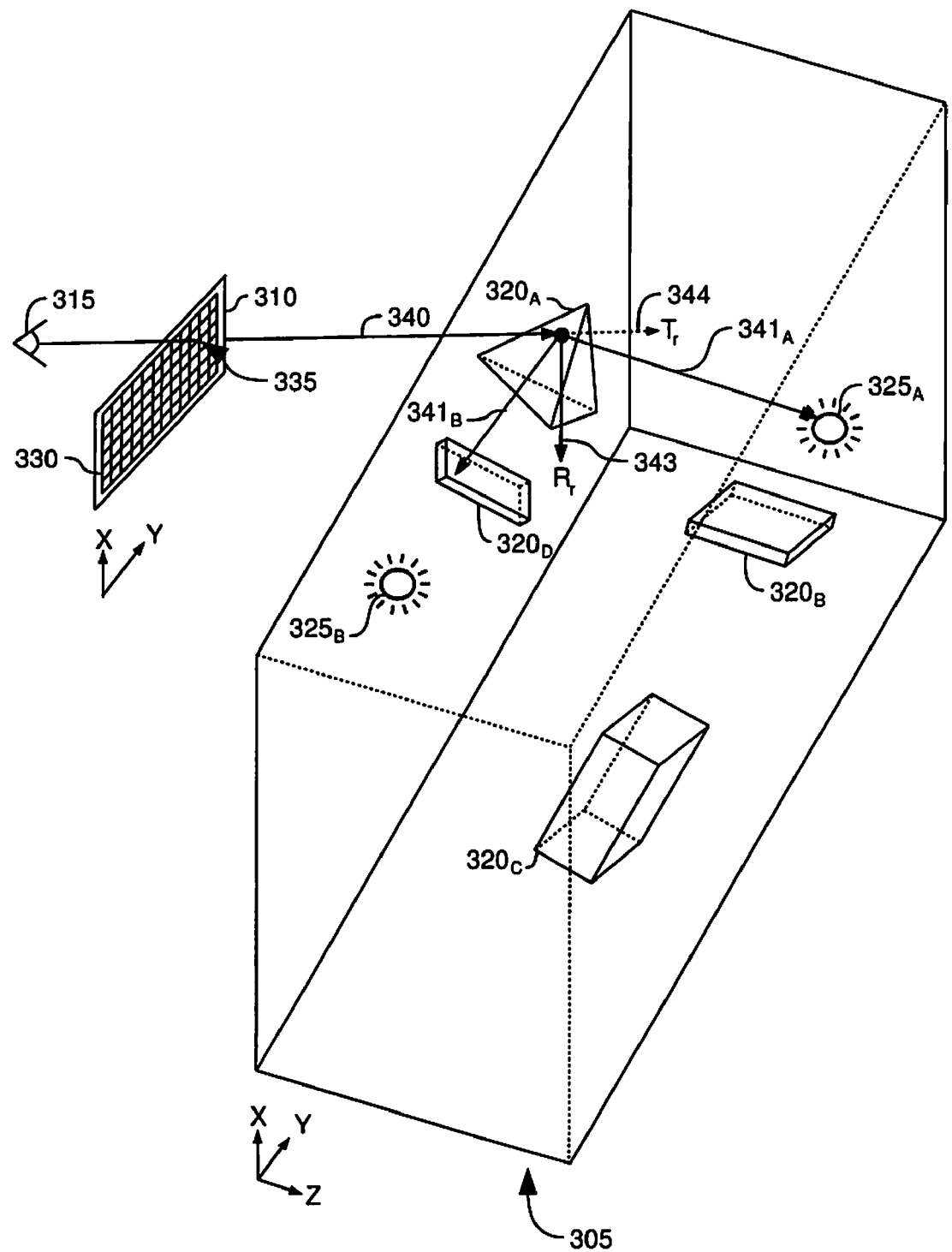
FIG. 3 is an exemplary three dimensional scene to be rendered by an image processing system, according to one embodiment of the invention.

FIG. 3 is an exemplary three dimensional scene 305 to be rendered by an image processing system. Within the three dimensional scene 305 may be objects 320. The objects 320 in FIG. 3 are of different geometric shapes. Although only four objects 320 are illustrated in FIG. 3, the number of objects in a typical three dimensional scene may be more or less. Commonly, three dimensional scenes will have many more objects than illustrated in FIG. 3.

As can be seen in FIG. 3 the objects are of varying geometric shape and size. For example, one object in FIG. 3 is a pyramid $320_A$. Other objects in FIG. 3 are boxes $320_{B-D}$. In many modern image processing systems objects are often broken up into smaller geometric shapes (e.g., squares, circles, triangles, etc.). The larger objects are then represented by a number of the smaller simple geometric shapes. These smaller geometric shapes are often referred to as primitives.

Also illustrated in the scene 305 are light sources $325_{A-B}$. The light sources may illuminate the objects 320 located within the scene 305. Furthermore, depending on the location of the light sources 325 and the objects 320 within the scene 305, the light sources may cause shadows to be cast onto objects within the scene 305.

The three dimensional scene 305 may be rendered into a two-dimensional picture by an image processing system. The image processing system may also cause the two-dimensional picture to be displayed on a monitor 310. The monitor 310 may use many pixels 330 of different colors to render the final two-dimensional picture.

One method used by image processing systems to render a three-dimensional scene 320 into a two dimensional picture is called ray tracing. Ray tracing is accomplished by the image processing system "issuing" or "shooting" rays from the perspective of a viewer 315 into the three-dimensional scene 320. The rays have properties and behavior similar to light rays.

One ray 340, that originates at the position of the viewer 315 and traverses through the three-dimensional scene 305, can be seen in FIG. 3. As the ray 340 traverses from the viewer 315 to the three-dimensional scene 305, the ray 340 passes through a plane where the final two-dimensional picture will be rendered by the image processing system. In FIG. 3 this plane is represented by the monitor 310. The point the ray 340 passes through the plane, or monitor 310, is represented by a pixel 335.

As briefly discussed earlier, most image processing systems use a grid 330 of thousands (if not millions) of pixels to render the final scene on the monitor 310. The grid 330 may be referred to as a frame. Each individual pixel may display a different color to render the final composite two-dimensional picture on the monitor 310. An image processing system using a ray tracing image processing methodology to render a two dimensional picture from a three-dimensional scene will calculate the colors that the issued ray or rays encounters in the three dimensional scene. The image processing scene will then assign the colors encountered by the ray to the pixel through which the ray passed on its way from the viewer to the three-dimensional scene.

The number of rays issued per pixel may vary. Some pixels may have many rays issued for a particular scene to be rendered. In which case the final color of the pixel is determined by the each color contribution from all of the rays that were issued for the pixel. Other pixels may only have a single ray issued to determine the resulting color of the pixel in the two-dimensional picture. Some pixels may not have any rays issued by the image processing system, in which case their color may be determined, approximated or assigned by algorithms within the image processing system.

To determine the final color of the pixel 335 in the two dimensional picture, the image processing system must determine if the ray 340 intersects an object within the scene. If the ray does not intersect an object within the scene it may be assigned a default background color (e.g., blue or black, representing the day or night sky). Conversely, as the ray 340 traverses through the three dimensional scene 305 the ray 340 may strike objects. As the rays strike objects within the scene, the color of the object may be assigned to the pixel through which the ray passes. However, the color of the object must be determined before it is assigned to the pixel.

Many factors may contribute to the color of the object struck by the original ray 340. For example, light sources within the three dimensional scene may illuminate the object. Furthermore, physical properties of the object may contribute to the color of the object. For example, if the object is reflective or transparent, other non-light source objects may then contribute to the color of the object.

In order to determine the effects from other objects within the three dimensional scene, secondary rays may be issued from the point where the original ray 340 intersected the object. For example, shadow rays 341 may be issued to determine the contribution of light to the point where the original ray 340 intersected the object. If the object has translucent properties, the image processing system may issue a transmitted ray 344 to determine what color or light to be transmitted through the body of the object. If the object has reflective properties, the image processing system may issue a reflected ray to determine what color or light is reflected onto the object 320.

One type of secondary ray may be a shadow ray. Each shadow ray may be traced from the point of intersection of the original ray and the object, to a light source within the three-dimensional scene 305. If the ray reaches the light source without encountering another object before the ray reaches the light source, then the light source will illuminate the object struck by the original ray at the point where the original ray struck the object.

For example, shadow ray $341_A$ may be issued from the point where original ray 340 intersected the object $320_A$, and may traverse in a direction towards the light source $325_A$. The shadow ray $341_A$ reaches the light source $325_A$ without encountering any other objects 320 within the scene 305. Therefore, the light source $325_A$ will illuminate the object $320_A$ at the point where the original ray 340 intersected the object $320_A$.

Other shadow rays may have their path between the point where the original ray struck the object and the light source blocked by another object within the three-dimensional scene. If the object obstructing the path between the point on the object the original ray struck and the light source is opaque, then the light source will not illuminate the object at the point where the original ray struck the object. Thus, the light source may not contribute to the color of the original ray and consequently neither to the color of the pixel to be rendered in the two-dimensional picture. However, if the object is translucent or transparent, then the light source may illuminate the object at the point where the original ray struck the object.

For example, shadow ray $341_B$ may be issued from the point where the original ray 340 intersected with the object $320_A$, and may traverse in a direction towards the light source $325_B$. In this example, the path of the shadow ray $341_B$ is blocked by an object $320_D$. If the object $320_D$ is opaque, then the light source $325_B$ will not illuminate the object $320_A$ at the point where the original ray 340 intersected the object $320_A$. However, if the object $320_D$ which the shadow ray is translucent or transparent the light source $325_B$ may illuminate the object $320_A$ at the point where the original ray 340 intersected the object $320_A$.

Another type of secondary ray is a transmitted ray. A transmitted ray may be issued by the image processing system if the object with which the original ray intersected has transparent or translucent properties (e.g., glass). A transmitted ray traverses through the object at an angle relative to the angle at which the original ray struck the object. For example, transmitted ray 344 is seen traversing through the object $320_A$ which the original ray 340 intersected.

Another type of secondary ray is a reflected ray. If the object with which the original ray intersected has reflective properties (e.g. a metal finish), then a reflected ray will be issued by the image processing system to determine what color or light may be reflected onto the object. Reflected rays traverse away from the object at an angle relative to the angle at which the original ray intersected the object. For example, reflected ray 343 may be issued by the image processing system to determine what color or light may be reflected onto the object $320_A$ which the original ray 340 intersected.

The total contribution of color and light of all secondary rays (e.g., shadow rays, transmitted rays, reflected rays, etc.) will result in the final color of the pixel through which the original ray passed.

An Exemplary KD-Tree

One problem encountered when performing ray tracing is determining quickly and efficiently if an issued ray intersects any objects within the scene to be rendered. One methodology known by those of ordinary skill in the art to make the ray intersection determination more efficient is to use a spatial index. A spatial index divides a three-dimensional scene or world into smaller volumes (smaller relative to the entire three-dimensional scene) which may or may not contain primitives. An image processing system can then use the known boundaries of these smaller volumes to determine if a ray may intersect primitives contained within the smaller volumes. If a ray does intersect a volume containing primitives, then a ray intersection test can be run using the trajectory of the ray against the known location and dimensions of the primitives contained within that volume. If a ray does not intersect a particular volume, then there is no need to run ray-primitive intersection tests against the primitives contained within that volume. Furthermore, if a ray intersects a bounding volume which does not contain primitives then there is no need to run ray-primitive intersections tests against that bounding volume. Thus, by reducing the number of ray-primitive intersection tests which may be necessary, the use of a spatial index greatly increases the performance of a ray tracing image processing system. Some examples of different spatial index acceleration data structures are octrees, k dimensional Trees (kd-Trees), and binary space partitioning trees (BSP trees). While several different spatial index structures exist, for ease of describing embodiments of the present invention, a kd-Tree will be used in the examples to follow. However, those skilled in the art will readily recognize that embodiments of the invention may be applied to any of the different types of spatial indexes.

A kd-Tree uses axis aligned bounding volumes to partition the entire scene or space into smaller volumes. That is, the kd-Tree may divide a three dimensional space encompassed by a scene through the use of splitting planes which are parallel to known axes. The splitting planes partition a larger space into smaller bounding volumes. Together the smaller bounding volumes make up the entire space in the scene. The determination to partition (divide) a larger bounding volume into two smaller bounding volumes may be made by the image processing system through the use of a kd-tree construction algorithm.

One criterion for determining when to partition a bounding volume into smaller volumes may be the number of primitives contained within the bounding volume. That is, as long as a bounding volume contains more primitives than a predetermined threshold, the tree construction algorithm may continue to divide volumes by drawing more splitting planes. Another criterion for determining when to partition a bounding volume into smaller volumes may be the amount of space contained within the bounding volume. Furthermore, a decision to continue partitioning the bounding volume may also be based on how many primitives may be intersected by the plane which creates the bounding volume.

The partitioning of the scene may be represented by a binary tree structure made up of nodes, branches and leaves. Each internal node within the tree may represent a relatively large bounding volume, while the node may contain branches to sub-nodes which may represent two relatively smaller partitioned volumes resulting after a partitioning of the relatively large bounding volume by a splitting plane. In an axis-aligned kd-Tree, each internal node may contain only two branches to other nodes. The internal node may contain branches (i.e., pointers) to one or two leaf nodes. A leaf node is a node which is not further sub-divided into smaller volumes and contains pointers to primitives. An internal node may also contain branches to other internal nodes which are further sub-divided. An internal node may also contain the information needed to determine along what axis the splitting plane was drawn and where along the axis the splitting plane was drawn.

Exemplary Bounding Volumes

Figure 4A:
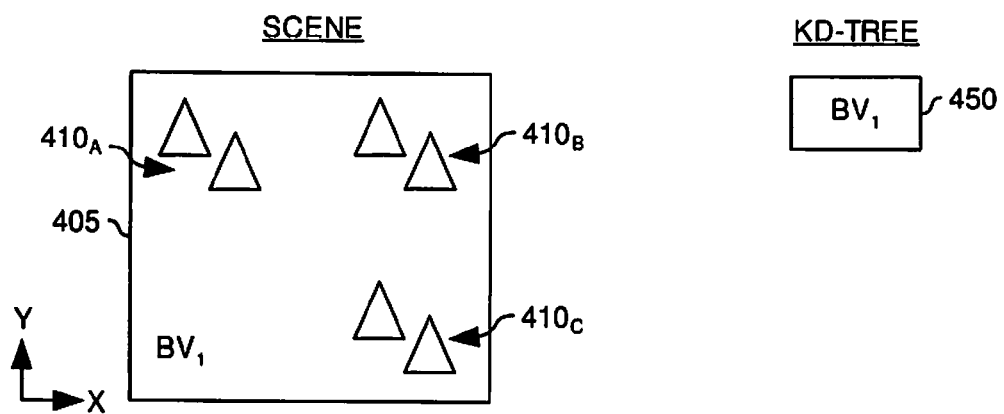
FIGS. 4A-4C illustrate a two dimensional space to be rendered by an image processing system and a corresponding spatial index created by an image processing system, according to one embodiment of the invention.
Figure 4B:
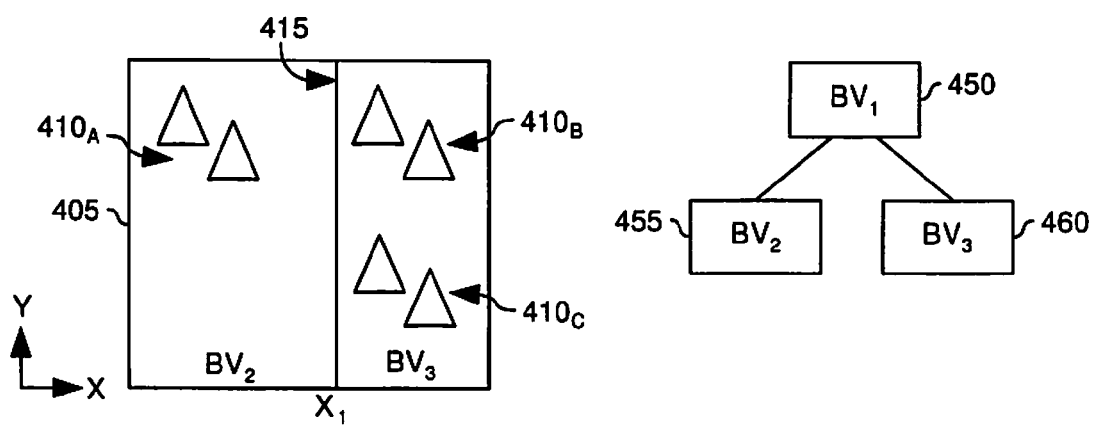
Figure 4C:
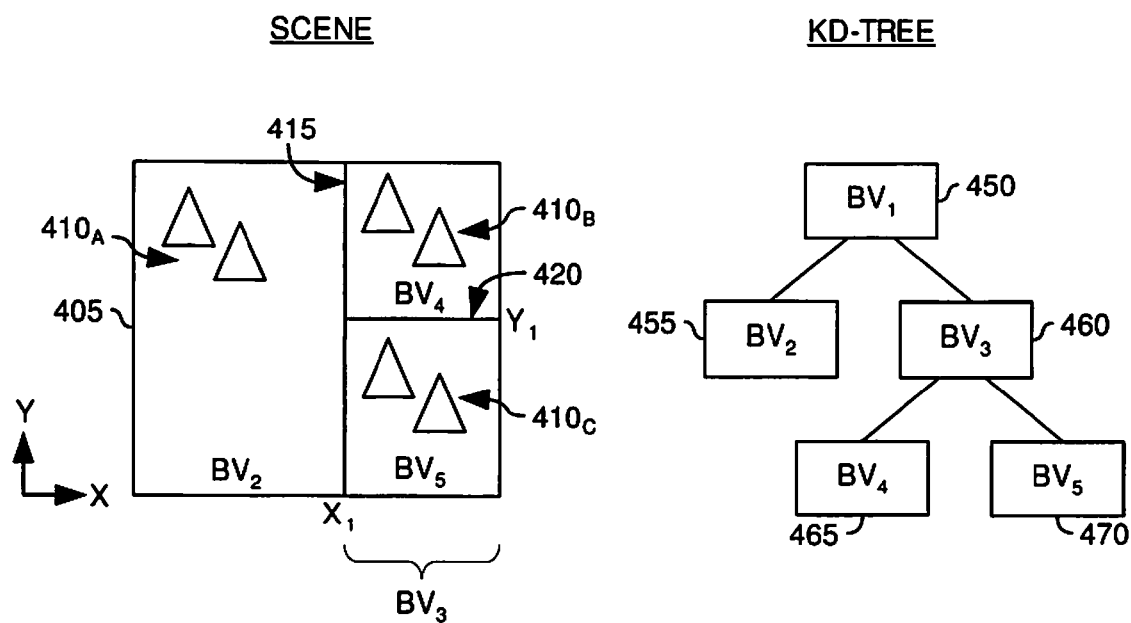

FIGS. 4A-4C illustrate a two dimensional space to be rendered by an image processing system and a corresponding kd-tree. For simplicity, a two dimensional scene is used to illustrate the building of a kd-Tree, however kd-Trees may also be used to represent three dimensional scenes. In the two dimensional illustration of FIGS. 4A-4C splitting lines are illustrated instead of splitting planes, and bounding areas are illustrated instead of bounding volumes as would be used in a three dimensional structure. However, one skilled in the art will quickly recognize that the concepts may easily be applied to a three dimensional scene containing objects.

FIG. 4A illustrates a two dimensional scene 405 containing primitives 410 to be rendered in the final picture to be displayed on a monitor 310. The largest volume which represents the entire volume of the scene is encompassed by bounding volume 1 ($BV_1$). In the corresponding kd-Tree this may be represented by the top level node 450, also known as the root or world node. In one embodiment of an image processing system, an image processing system may continue to partition bounding volumes into smaller bounding volumes when the bounding volume contains, for example, more than two primitives. As noted earlier the decision to continue partitioning a bounding volume into smaller bounding volumes may be based on many factors, however for ease of explanation in this example the decision to continue partitioning a bounding volume is based only on the number of primitives. As can be seen in FIG. 4A, $BV_1$ contains six primitives, therefore kd-Tree construction algorithm may partition $BV_1$ into smaller bounding volumes.

FIG. 4B illustrates the same two dimensional scene 405 as illustrated in FIG. 4A. However, in FIG. 4B the tree construction algorithm has partitioned $BV_1$ into two smaller bounding volumes $BV_2$ and $BV_3$. The partitioning of $BV_1$, was accomplished, by drawing a splitting plane $SP_1$ 415 along the x-axis at point $x_1$. This partitioning of $BV_1$ is also reflected in the kd-Tree as the two nodes 455 and 460, corresponding to $BV_2$ and $BV_3$ respectively, under the internal or parent node $BV_1$ 450. The internal node representing $BV_1$ may now store information such as, but not limited to, pointers to the two nodes beneath $BV_1$ (e.g., $BV_2$ and $BV_3$), along which axis the splitting plane was drawn (e.g., x-axis), and where along the axis the splitting plane was drawn (e.g., at point $x_1$).

The kd-Tree construction algorithm may continue to partition bounding volume $BV_3$ because it contains more than the predetermined threshold of primitives (e.g., more than two primitives). However, the kd-Tree construction algorithm may not continue to partition bounding volume $BV_2$, because bounding volume $BV_2$ contains less than or equal to the number of primitives (e.g., only two primitives $410_A$). Nodes which are not partitioned or sub-divided any further, such as $BV_2$, are referred to as leaf nodes.

FIG. 4C illustrates the same two dimensional scene 405 as illustrated in FIG. 4B. However, in FIG. 4C the kd-Tree construction algorithm has partitioned $BV_3$ into two smaller bounding volumes $BV_4$ and $BV_5$. The kd-construction algorithm has partitioned $BV_3$ using a partitioning plane along the y-axis at point $y_1$. Since $BV_3$ has been partitioned into two sub-nodes it may now be referred to as an internal node. The partitioning of $BV_3$ is also reflected in the kd-Tree as the two leaf nodes 465 and 470, corresponding to $BV_4$ and $BV_5$ respectively. $BV_4$ and $BV_5$ are leaf nodes because the volumes they represent are not further divided into smaller bounding volumes. The two leaf nodes, $BV_4$ and $BV_5$, are located under the internal node $BV_3$ which represents the bounding volume which was partitioned in the kd-Tree.

The internal node representing $BV_3$ may store information such as, but not limited to, pointers to the two leaf nodes (i.e., $BV_4$ and $BV_5$), along which axis the splitting plane was drawn (i.e., y-axis), and where along the axis the splitting plane was drawn (i.e., at point $y_1$).

The kd-Tree construction algorithm may now stop partitioning the bounding volumes because all bounding volumes located within the scene contain less than or equal to the maximum predetermined number of primitives which may be enclosed within a bounding volume. The leaf nodes may contain pointers to the primitives which are enclosed within the bounding volumes each leaf represents. For example, leaf node $BV_2$ may contain pointers to primitives $410_A$, leaf node $BV_4$ may contain pointers to primitives $410_B$, and leaf node $BV_5$ may contain pointers to primitives $410_C$.

A ray tracing image processing system may use the workload manager 205 to traverse the spatial index (kd-Tree). Traversing the kd-Tree may include selecting a branch to a node on a lower level (sub-node) of the kd-Tree to take or proceed to in order to determine if the ray intersects any primitives contained within the sub-node. A workload manager 205 may use the coordinates and trajectory of an issued ray to traverse or navigate through the kd-Tree. By executing ray-bounding volume intersection tests, the workload manager 205 may determine if the ray intersects a plane of the bounding volumes represented by nodes within the kd-Tree structure. If the ray intersects a bounding volume which contains only primitives (i.e., a leaf node), then the workload manager 205 may send the ray and associated information to a vector throughput engine 210 for ray-primitive intersection tests. A ray-primitive intersection test may be executed to determine if the ray intersects the primitives within the bounding volume. This methodology results in fewer ray-primitive intersection tests needed to determine if a ray intersects an object within the scene, in comparison to running ray-primitive intersection tests for a ray against each primitive contained within the scene.

The resulting kd-Tree structure, or other spatial index structure, may be stored in a processor cache 230. The kd-Tree and the size of corresponding data which comprises the kd-Tree may be optimized for storage in a processor cache 230. The storage of the kd-Tree in a processor cache 230 may allow a workload manager 205 to traverse the kd-Tree with a ray that has been issued by the image processing system without having to retrieve the kd-Tree from memory every time a ray is issued by the image processing system.

Multiple Spatial Indexes

Figure 5:
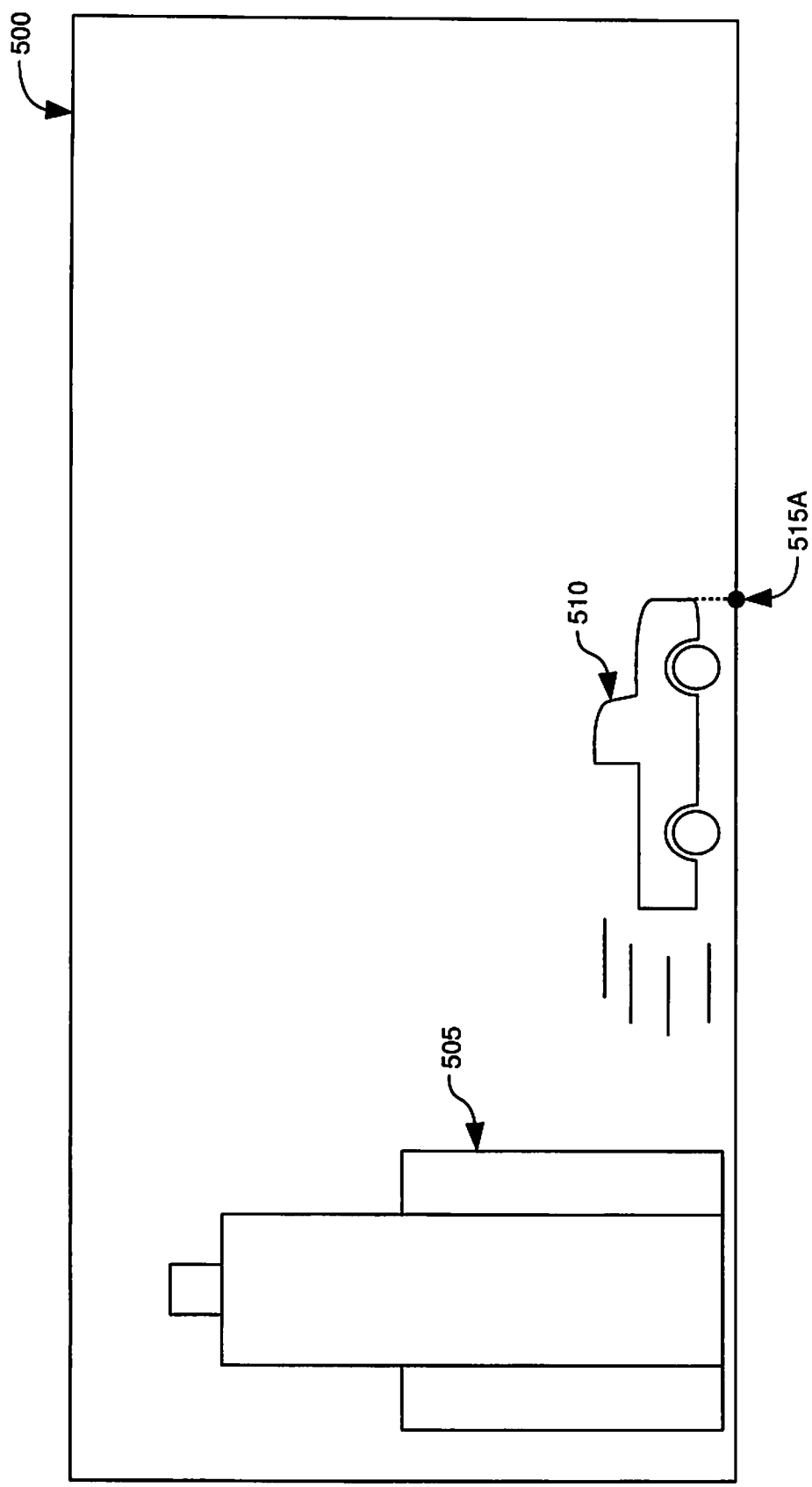
FIGS. 5 and 8 illustrate a three dimensional scene to be rendered by an image processing system, according to one embodiment of the invention.

Three dimensional scenes may have static and dynamic objects. Static objects may be objects that do not move or change shape over a relatively long period of time (e.g., for several frames). For example, a building may be considered a static object. FIG. 5 illustrates an exemplary building 505 within a three dimensional scene 500. The building 505 in FIG. 5 is a static object because it may not move or change shape over a relatively long period of time.

In contrast, a dynamic object may move or change shape over a relatively short period of time (e.g., over a period of a frame or two). A car may be an example of a dynamic object. For example, FIG. 5 illustrates a car 510 which may move horizontally within the three dimensional scene 500 over a relatively short period of time.

As described previously, an image processing system may use a spatial index (e.g., a kd-tree) to render a two dimensional image (i.e., a frame) from a three dimensional scene. If the scene changes (e.g., objects in the scene move or change shape) the image processing system may have to change or rebuild the spatial index which represents the objects within the three dimensional scene in order to correctly render the next two dimensional image or frame.

If all of the objects within the three dimensional scene are static (i.e., the do not change shape or move) from frame to frame, the spatial index does not have to be rebuilt from frame to frame. However, if the image processing system only uses a single spatial index for ray tracing and some objects within the frame move or change shape from one frame to the next, the spatial index needs to be rebuilt to correctly represent the changes in the objects which make up the scene. For example, when a dynamic object moves from a first position in a first frame to a second position in a second frame, a spatial index which represents the first position of the object in the first frame may not correctly represent the second position of the object in the second frame. Therefore, the spatial index may need to be rebuilt to correctly represent the second position of the object in the second frame.

Even if only a minimal portion of the three dimensional scene changes, rebuilding the entire spatial index by the image processing system may require a considerable amount of processing cycles and thus may increase the overall amount of time required to render a two dimensional image from a three dimensional scene. However, according to one embodiment of the invention, two separate spatial indexes may be built in order to reduce the amount of time necessary to respond to changes in position or shape of objects in the three dimensional scene. By reducing the amount of time necessary to respond to changes, the amount of time necessary to render a two dimensional image from a three dimensional scene may be reduced as well.

Figure 6:
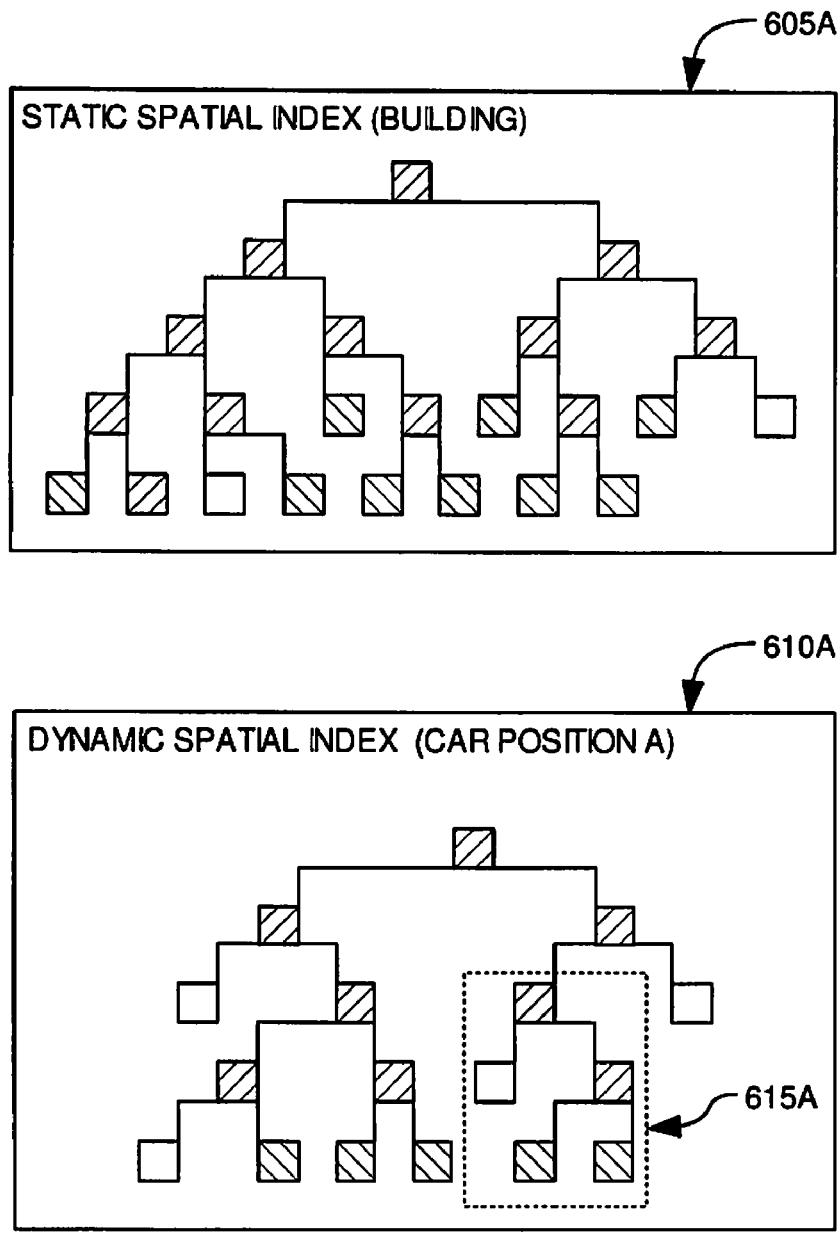
FIGS. 6 and 9 illustrate a static spatial index and a dynamic spatial index, according to one embodiment of the invention.
Figure 6:
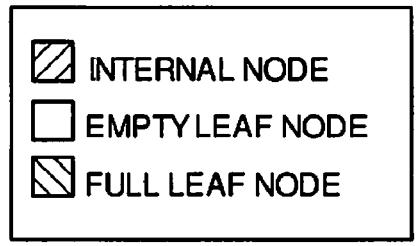

FIG. 6 illustrates two separate spatial indexes which together may represent all objects within a three dimensional scene, according to one embodiment of the invention. A first index may be, for example, a static spatial index 605A which may represent all of the static objects within a three dimensional scene. A second spatial index may be, for example, a dynamic spatial index 610A which may represent dynamic objects within a three dimensional scene, according to one embodiment of the invention.

For illustrative purposes, the three dimensional scene to which the static spatial index corresponds may be the three dimensional scene 500 of FIG. 5. Therefore, the static spatial index 605A may represent the static object, the building 505, in the three dimensional scene 500 of FIG. 5. Furthermore, the dynamic spatial index 610A may correspond to the dynamic object (i.e., the car 610) in the three dimensional scene 500 of FIG. 5.

An image processing system using a workload manager 205 to traverse a spatial index may store the spatial index in memory. For example, the image processing system may store the spatial index in the memory cache of a processing element (e.g., the memory cache 230 of FIG. 2).

Figure 7:
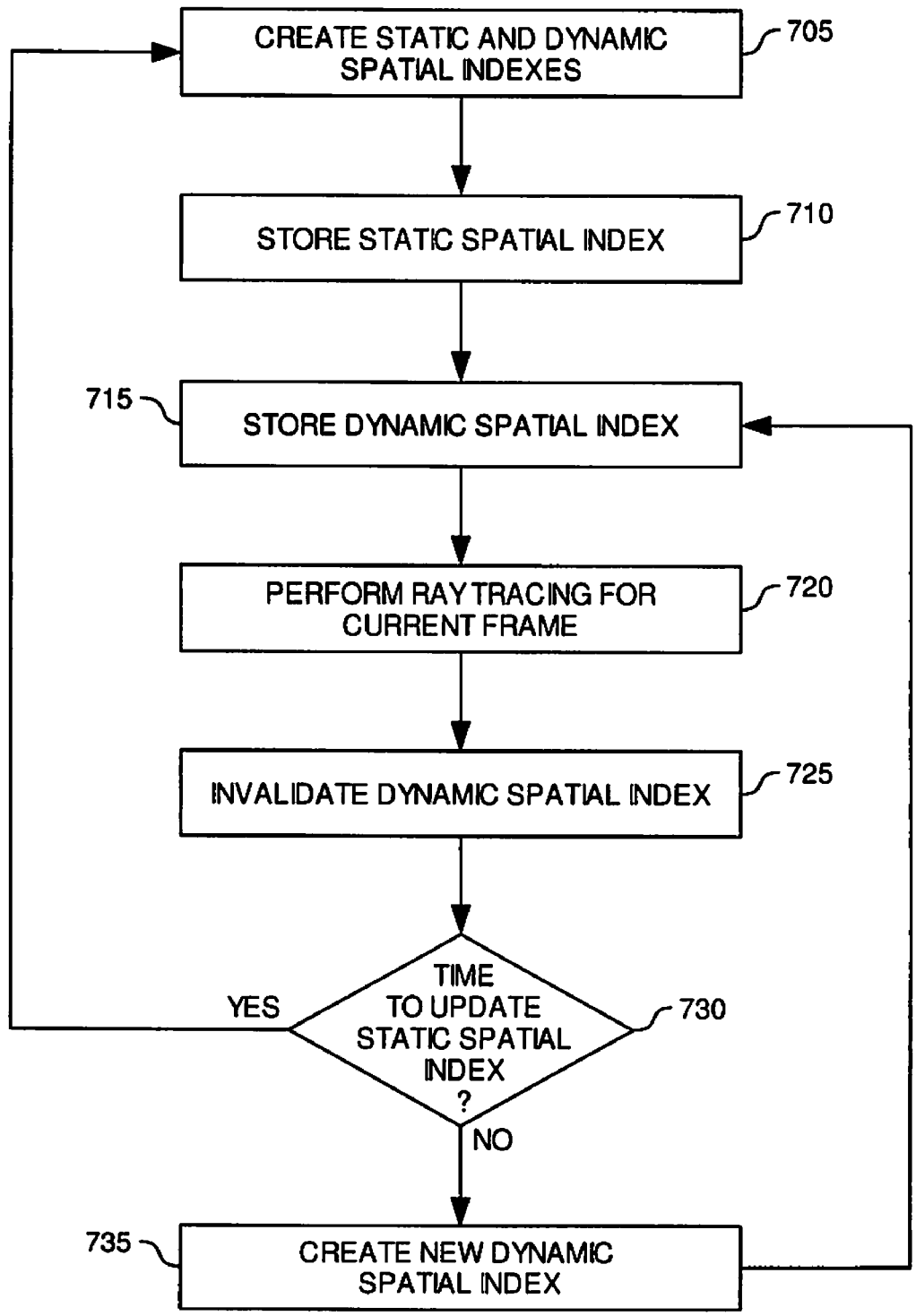
FIG. 7 is a flowchart illustrating a method of creating spatial indexes and managing the storage of the spatial indexes, according to one embodiment of the invention.

FIG. 7 is a flowchart illustrating a method 700 for creating static and dynamic spatial indexes and storing static and dynamic spatial indexes, according to one embodiment of the invention. The method 700 may begin at step 705 where the image processing system may create a static spatial index (e.g., the static spatial index 605A in FIG. 6) which represents static objects within the three dimensional scene. For example, the image processing system may construct a kd-tree as described previously with respect to FIG. 4. Also at step 705 the image processing system may create a dynamic spatial index (e.g., the dynamic spatial index 610A in FIG. 6) which represents all of the dynamic objects within the three dimensional scene. The image processing system may construct the same type of spatial index as the static spatial index or may construct a different type of spatial index in comparison to the static spatial index. For example, both the static and dynamic spatial indexes may be kd-trees, or the static spatial index may be a kd-tree and the dynamic spatial index may be a bsp-tree.

Next, at step 710 the image processing system may store the static spatial index in a static spatial index portion of memory. For example, the image processing system may store the static spatial index in a first portion of the memory cache 230. After the image processing system is finished storing the static spatial index, the image processing system may proceed to step 715. At step 715, the image processing system may store the dynamic spatial index in a dynamic spatial index portion of memory. For example, the image processing system may store the dynamic spatial index in a second portion of the memory cache 230.

Next at step 720 the image processing system may perform ray tracing for the current frame being rendered. In step 720 a workload manager 205, or workload managers $205_{1-N}$, may use the static spatial index 605A and the dynamic spatial index 610A to trace rays through the three dimensional scene 500. After a workload manager 205 has traversed the ray to a leaf node of either, or both, of the spatial indexes the workload manager may send the ray to a vector throughput engine 210.

The vector throughput engine 210 may determine if the ray strikes a primitive contained within the bounding volume corresponding to the traversed to leaf node(s).

The ray may strike a primitive within a bounding volume corresponding to a leaf node of the static spatial index and a primitive within a bounding volume corresponding to a leaf node of the dynamic spatial index. If so, the first intersected primitive will be used to determine the color of the pixel through which the ray passed.

The image processing system may determine which primitive was intersected first, for example, by calculating the distance between a viewpoint (e.g., viewpoint 315 illustrated in FIG. 3) from which the ray originated and a point where the ray intersected a primitive. The primitive which was intersected first may have the shortest distance between the viewpoint and the point at which the ray intersected the primitive.

The image processing system may continue to trace rays through the three dimensional scene until a sufficient number of rays have been traced to render a two dimensional image (i.e., a frame) from the three dimensional scene.

After the image processing system has finished performing ray tracing for the current frame, the image processing system may proceed to step 725. At step 725 the image processing system may invalidate the dynamic spatial index. The image processing system may invalidate the dynamic spatial index, for example, by invalidating the memory space where the dynamic spatial index is stored. Invalidation of the dynamic spatial index may be performed to purge the now obsolete dynamic spatial index from memory. The invalidation of the dynamic spatial index may be performed in anticipation that a new dynamic spatial index may need to be created and saved in memory for the next frame to be rendered by the image processing system. A new dynamic spatial index may need to be created, for example, to reflect new positions of dynamic objects in the next frame to be rendered.

Next at step 730 the image processing system may determine if it is time to update the static spatial index. The image processing system may determine that it is time to update the static spatial index, for example, if objects which were once considered static objects move or change shape and hence need to be considered dynamic objects rather than static objects. Furthermore, it may be time to update the static spatial index, for example, if objects which were once dynamic are no longer moving or changing shape and now may be considered static objects. Although at times the image processing system may determine at step 730 that the static spatial index may need to be updated, the frequency of this determination may be lower than the frequency of the need to update the dynamic spatial index. For example, a new dynamic spatial index may need to be created from frame to frame whereas a static spatial index may only need to be updated after sixty frames have passed.

If it is time to update the static spatial index, the image processing system may return to step 705 where the static and dynamic spatial indexes may be updated to correspond to changes in objects within the three dimensional scene.

However, if it is not time to update the static spatial index the image processing system may proceed to step 735. At step 735 the image processing system may create a new dynamic spatial index which may be used for the next frame to be rendered by the image processing system. The new dynamic spatial index may reflect the new positions or shapes of dynamic objects within the three dimensional scene.

Figure 8:
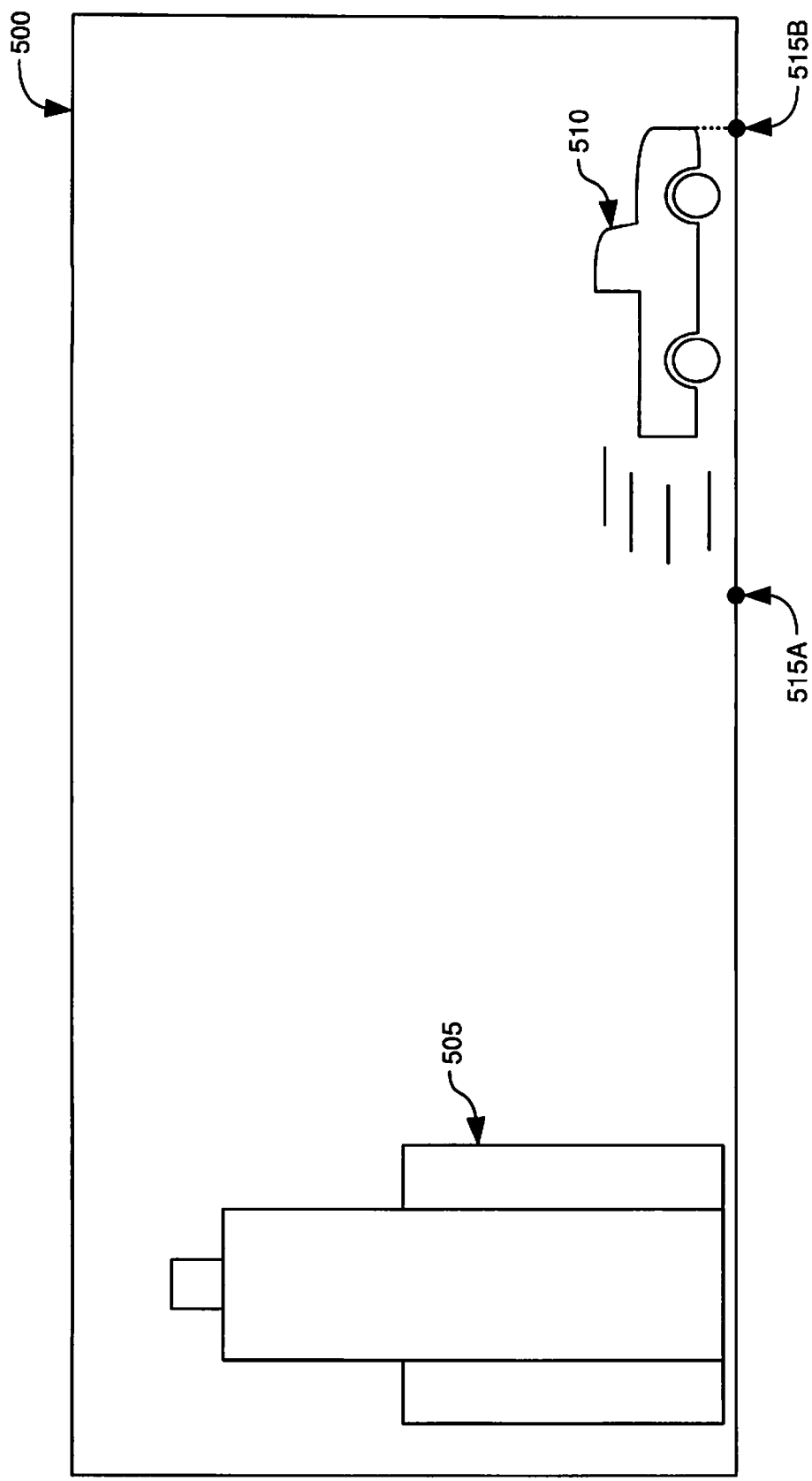

For example, FIG. 8 illustrates the three dimensional scene 500 which was also illustrated in FIG. 5. However, the dynamic object in the three dimensional scene 500 (i.e., the car 510) has moved from a first position 515A in the three dimensional scene 500 to a new position 515B. However, the static object (i.e., the building 505) has remained in the same position. Consequently, in order to properly represent the new three dimensional scene 500 a new dynamic spatial index may be created by the image processing system, according to embodiments of the invention. The new dynamic spatial index may reflect the movement of the dynamic object(s) within the scene (i.e., the car 510). In contrast, according to embodiments of the intervention, since the static objects have not changed position in the three dimensional scene 500, the static spatial index which was created to represent to the static objects present in FIG. 5 correctly represents the static objects present in FIG. 8.

Therefore, instead of rebuilding a single spatial index which represents all objects (i.e., static and dynamic) within the entire three dimensional scene in response to movement of the dynamic objects within the scene, only the dynamic spatial index must be rebuilt to correspond to the movement of objects within the three dimensional scene. Rebuilding a spatial index which only represents a portion of the objects within the three dimensional scene (i.e., the dynamic spatial index) may require less time in contrast to rebuilding a spatial index which represents all of the objects (i.e., dynamic and static).

After the image processing system has created a new dynamic spatial index 610B, the image processing system may return to step 715 where the image processing system may store the new dynamic spatial index 610B in a dynamic spatial index portion of memory.

Figure 9:
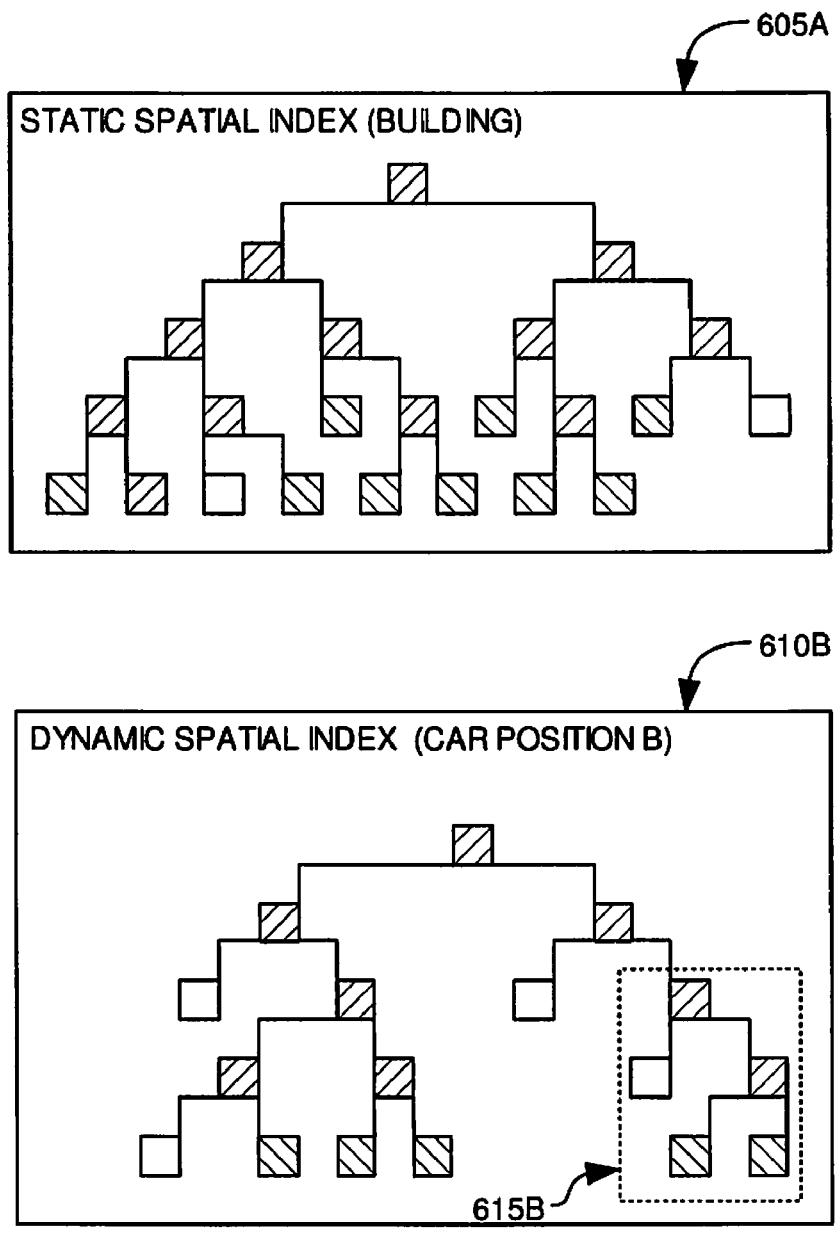
Figure 9:
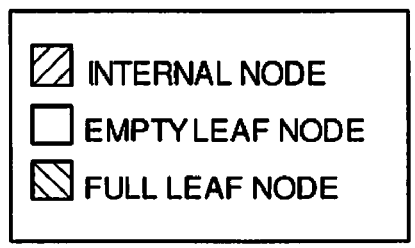

FIG. 9 illustrates the memory cache 620 which was used to store the dynamic and spatial indexes which represented FIG. 5. However, the image processing system has since replaced the dynamic spatial index corresponding to the old position or shape of objects within the three dimensional scene with a new dynamic spatial index. For example, a new dynamic spatial index 610B which may represent the new position 515B of the car 510. The new dynamic spatial index 610B may differ only slightly from the dynamic spatial index 610A which represented the initial position 515A of the car 510. As illustrated in FIG. 9, the difference between the old dynamic spatial index and the new dynamic spatial index is a portion 615B of the dynamic spatial index 610B. This portion 615B of the dynamic spatial index may correspond to the change in position of the car 510B from the first position 515A to the second position 515B.

Also illustrated in FIG. 9 is the static spatial index 605A. The static spatial index 605A has not changed from FIG. 6 to FIG. 9 because the static object (i.e., the building 505) has not changed position or shape in the three dimensional scene 500.

Conclusion

According to embodiments of the invention, separate spatial indexes may be created which correspond to dynamic objects in a three dimensional scene and static objects in the three dimensional scene. By creating separate spatial indexes for static and dynamic objects, only the dynamic spatial index may need to be rebuilt in response to movement or changes in shape of objects in the three dimensional scene. Furthermore, the static and dynamic spatial indexes may be stored in separate portions of an image processing system's memory cache. By storing the static spatial index and the dynamic spatial index in separate portions of the memory cache, the dynamic portion of the memory cache may be updated without affecting the static portion of the spatial index in the memory cache. Furthermore, by creating separate spatial indexes for static and dynamic objects, the amount of time necessary to rebuild a spatial index structure in response to movement or changes of objects within a three dimensional scene move may be reduced.

While the foregoing is directed to embodiments of the present invention, other and further embodiments of the invention may be devised without departing from the basic scope thereof, and the scope thereof is determined by the claims that follow.

What is claimed is:

1. A method of representing objects located within a three dimensional scene in spatial indexes, the method comprising:
configuring one or more computer processors to perform an operation, comprising:
generating a static spatial index based on at least one static object in the three dimensional scene, the static spatial index having nodes defining bounded volumes of the three dimensional scene;
generating a dynamic spatial index separate from the static spatial index based on at least one dynamic object in the three dimensional scene, the dynamic spatial index having nodes defining bounded volumes of the three dimensional scene, wherein the spatial indexes partition the three dimensional scene into smaller volumes through a use of splitting planes, each of which is parallel to a selected axis;
issuing a ray into the three dimensional scene;
traversing the dynamic spatial index by taking branches to nodes based on the ray intersecting bounding volumes corresponding to nodes in the dynamic spatial index until a dynamic spatial index leaf node is reached, and determining if the ray strikes a primitive contained within a bounding volume corresponding to the dynamic spatial index leaf node;
traversing the static spatial index based on the ray intersecting bounding volumes corresponding to nodes in static spatial index until a static spatial index leaf node is reached, and determining if the ray strikes a primitive contained within a bounding volume corresponding to the static spatial index leaf node; and
if a primitive was struck in both the dynamic spatial index leaf node and the static spatial index leaf node, determining a primitive that was intersected first.

2. The method of claim 1, further comprising:
storing the static spatial index in a first portion of a memory cache; and
storing the dynamic spatial index in a second portion of the memory cache.

3. The method of claim 2, further comprising periodically invalidating the second portion of the memory cache after a predetermined amount of time has passed.

4. The method of claim 3, wherein the predetermined amount of time corresponds to the amount of time necessary to render a two dimensional image from the three dimensional scene.

5. The method of claim 1, further comprising periodically rebuilding the static spatial index when at least one static object in the three dimensional scene becomes at least one dynamic object in the three dimensional scene or when at least one dynamic object in the three dimensional scene becomes at least one static object in the three dimensional scene.

6. The method of claim 1, wherein determining a primitive that was intersected first comprises:
calculating a first distance from a view point to a primitive intersected in the dynamic spatial index;
calculating a second distance from the view point to a primitive intersected in the static spatial index;
and determining which primitive was intersected first by comparing the first distance to the second distance.

7. A non-transitory computer readable storage medium containing a program which, when executed, performs operations comprising:
generating a static spatial index based on at least one static object in a three dimensional scene, the static spatial index having nodes defining bounded volumes of the three dimensional scene;
generating a dynamic spatial index separate from the static spatial index based on at least one dynamic object in the three dimensional scene, the dynamic spatial index having nodes defining bounded volumes of the three dimensional scene, wherein the spatial indexes partition the three dimensional scene into smaller volumes through a use of splitting planes, each of which is parallel to a selected axis;
issuing a ray into the three dimensional scene;
traversing the dynamic spatial index by taking branches to nodes based on the ray intersecting bounding volumes corresponding to nodes in the dynamic spatial index until a dynamic spatial index leaf node is reached, and determining if the ray strikes a primitive contained within a bounding volume corresponding to the dynamic spatial index leaf node;
traversing the static spatial index based on the ray intersecting bounding volumes corresponding to nodes in static spatial index until a static spatial index leaf node is reached, and determining if the ray strikes a primitive contained within a bounding volume corresponding to the static spatial index leaf node; and
if a primitive was struck in both the dynamic spatial index leaf node and the static spatial index leaf node, determining a primitive that was intersected first.

8. The non-transitory computer readable storage medium of claim 7, wherein the operations further comprise:
storing the static spatial index in a first portion of a memory cache; and
storing the dynamic spatial index in a second portion of the memory cache.

9. The non-transitory computer readable storage medium of claim 8, wherein the operations further comprise periodically invalidating the second portion of the memory cache after a predetermined amount of time has passed.

10. The non-transitory computer readable storage medium of claim 9, wherein the predetermined amount of time corresponds to the amount of time necessary to render a two dimensional image from the three dimensional scene.

11. The non-transitory computer readable storage medium of claim 7, wherein determining a primitive that was intersected first comprises:
calculating a first distance from a view point to a primitive intersected in the dynamic spatial index;
calculating a second distance from the view point to a primitive intersected in the static spatial index;
and determining which primitive was intersected first by comparing the first distance to the second distance.

12. An image processing system, comprising:
a memory comprising:
a static spatial index based on at least one static object in a three dimensional scene, the static spatial index having nodes defining bounded volumes of the three dimensional scene; and
a dynamic spatial index separate from the static spatial index based on at least one dynamic object in the three dimensional scene, the dynamic spatial index having nodes defining bounded volumes of the three dimensional scene; and a first processing element configured to:
issue a ray into the three dimensional scene;
traverse the dynamic spatial index by taking branches to nodes based on the ray intersecting bounding volumes corresponding to nodes in the dynamic spatial index until a dynamic spatial index leaf node is reached, and determine if the ray strikes a primitive contained within a bounding volume corresponding to the dynamic spatial index leaf node;
traverse the static spatial index based on the ray intersecting bounding volumes corresponding to nodes in static spatial index until a static spatial index leaf node is reached, and determine if the ray strikes a primitive contained within a bounding volume corresponding to the static spatial index leaf node; and
if a primitive was struck in both the dynamic spatial index leaf node and the static spatial index leaf node, determine a primitive that was intersected first.

13. The image processing system of claim 12, wherein the first processing element further comprises a memory cache, wherein the static spatial index is stored in a first portion of the memory cache and the dynamic spatial index is stored in a second portion of the memory cache, and wherein the first processing element is further configured to periodically invalidate the second portion of the memory cache after a predetermined amount of time, wherein the predefined amount of time corresponds to the amount of time necessary to render a frame from the three dimensional image.

14. The image processing system of claim 12, wherein the image processing system is configured to periodically rebuild the static spatial index when at least one static object in the three dimensional scene becomes at least one dynamic object in the three dimensional scene or when at least one dynamic object in the three dimensional scene becomes at least one static object in the three dimensional scene.

15. The image processing system of claim 12, wherein determining a primitive that was intersected first comprises:
calculating a first distance from a view point to a primitive intersected in the dynamic spatial index;
calculating a second distance from the view point to a primitive intersected in the static spatial index;
and determining which primitive was intersected first by comparing the first distance to the second distance.

16. A method of representing objects located within a three dimensional scene in spatial indexes, the method comprising:
configuring one or more computer processors to perform an operation, comprising:
generating a static spatial index based on at least one static object in the three dimensional scene, the static spatial index having nodes defining bounded volumes of the three dimensional scene;
generating a dynamic spatial index separate from the static spatial index based on at least one dynamic object in the three dimensional scene, the dynamic spatial index having nodes defining bounded volumes of the three dimensional scene;
issuing a ray into the three dimensional scene;
traversing the dynamic spatial index by taking branches to nodes based on the ray intersecting bounding volumes corresponding to nodes in the dynamic spatial index until a dynamic spatial index leaf node is reached, and determining if the ray strikes a primitive contained within a bounding volume corresponding to the dynamic spatial index leaf node;
traversing the static spatial index based on the ray intersecting bounding volumes corresponding to nodes in static spatial index until a static spatial index leaf node is reached, and determining if the ray strikes a primitive contained within a bounding volume corresponding to the static spatial index leaf node; and
if a primitive was struck in both the dynamic spatial index leaf node and the static spatial index leaf node, determining a primitive that was intersected first.

17. The method of claim 16, wherein determining a primitive that was intersected first comprises:
calculating a first distance from a view point to a primitive intersected in the dynamic spatial index;
calculating a second distance from the view point to a primitive intersected in the static spatial index;
and determining which primitive was intersected first by comparing the first distance to the second distance.

18. A non-transitory computer readable storage medium containing a program which, when executed, performs operations comprising:
generating a static spatial index based on at least one static object in a three dimensional scene, the static spatial index having nodes defining bounded volumes of the three dimensional scene;
generating a dynamic spatial index separate from the static spatial index based on at least one dynamic object in the three dimensional scene, the dynamic spatial index having nodes defining bounded volumes of the three dimensional scene;
issuing a ray into the three dimensional scene;
traversing the dynamic spatial index by taking branches to nodes based on the ray intersecting bounding volumes corresponding to nodes in the dynamic spatial index until a dynamic spatial index leaf node is reached, and determining if the ray strikes a primitive contained within a bounding volume corresponding to the dynamic spatial index leaf node;
traversing the static spatial index based on the ray intersecting bounding volumes corresponding to nodes in static spatial index until a static spatial index leaf node is reached, and determining if the ray strikes a primitive contained within a bounding volume corresponding to the static spatial index leaf node; and
if a primitive was struck in both the dynamic spatial index leaf node and the static spatial index leaf node, determining a primitive that was intersected first.

19. The non-transitory computer readable storage medium of claim 18, wherein determining a primitive that was intersected first comprises:
calculating a first distance from a view point to a primitive intersected in the dynamic spatial index;
calculating a second distance from the view point to a primitive intersected in the static spatial index;
and determining which primitive was intersected first by comparing the first distance to the second distance.

* * * * *